US011664899B2

(12) United States Patent
Marchou et al.

(10) Patent No.: US 11,664,899 B2
(45) Date of Patent: May 30, 2023

(54) COMMUNICATION DEVICE DESIGNED FOR INTERIOR COMPARTMENTS, PARTICULARLY OF MOTOR VEHICLES

(71) Applicant: ORANGE, Issy-les-Moulineaux (FR)

(72) Inventors: Laurent Marchou, Chatillon (FR); Sylvain Leroux, Chatillon (FR); Micheline Perrufel, Chatillon (FR); Christophe Cutullic, Chatillon (FR); Philippe Dussaume, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/466,508

(22) PCT Filed: Nov. 22, 2017

(86) PCT No.: PCT/FR2017/053202
§ 371 (c)(1),
(2) Date: Jun. 4, 2019

(87) PCT Pub. No.: WO2018/104607
PCT Pub. Date: Jun. 14, 2018

(65) Prior Publication Data
US 2020/0083958 A1 Mar. 12, 2020

(30) Foreign Application Priority Data
Dec. 5, 2016 (FR) ...................................... 1661950

(51) Int. Cl.
*H04B 10/00* (2013.01)
*H04B 10/2575* (2013.01)
(Continued)

(52) U.S. Cl.
CPC ....... *H04B 10/25753* (2013.01); *B60R 16/03* (2013.01); *H04B 10/1143* (2013.01);
(Continued)

(58) Field of Classification Search
CPC ............ H04B 2210/006; H04B 10/808; H04B 10/40; H04B 10/1143; H04B 10/25753; H04B 10/116
See application file for complete search history.

(56) References Cited

U.S. PATENT DOCUMENTS 5,551,616 A * 9/1996 Stitt ........................ B60R 7/043
224/275
7,446,671 B2 * 11/2008 Giannopoulos ........ H05B 47/19
340/12.24
(Continued)

FOREIGN PATENT DOCUMENTS

EP      2768162 A1    8/2014
EP      2846482 A1    3/2015
(Continued)

OTHER PUBLICATIONS

International Search Report dated Feb. 21, 2018 for corresponding International Application No. PCT/FR2017/053202, filed Nov. 22, 2017.
(Continued)

*Primary Examiner* — Pranesh K Barua
(74) *Attorney, Agent, or Firm* — David D. Brush; Westman, Champlin & Koehler, P.A.

(57) ABSTRACT

A communication device designed for an interior compartment, for example of a motor vehicle. The device includes a radiofrequency communication module and an interface module which is operationally coupled to the radiofrequency communication module in order to receive a digital signal generated by the radiofrequency communication module, and to modulate an electric power supply signal for at least one lamp, according to the digital signal, in order to generate a modulation of light emitted by the lamp according to the digital signal received from the radiofrequency communication module.

14 Claims, 3 Drawing Sheets

(51) Int. Cl.
  *B60R 16/03* (2006.01)
  *H04B 10/114* (2013.01)
  *H04B 10/40* (2013.01)
  *H04B 10/80* (2013.01)

(52) U.S. Cl.
  CPC ........... *H04B 10/40* (2013.01); *H04B 10/808* (2013.01); *H04B 2210/006* (2013.01)

(56) References Cited

U.S. PATENT DOCUMENTS

| | | | |
|---|---|---|---|
| 8,503,886 B1* | 8/2013 | Gunasekara | H04B 10/116 398/118 |
| 8,548,332 B2 | 10/2013 | Schmitt | |
| 2004/0092156 A1* | 5/2004 | Arkin | H01R 31/065 439/491 |
| 2004/0207262 A1* | 10/2004 | Yanagida | H04B 3/56 307/10.1 |
| 2004/0208013 A1* | 10/2004 | Dalton, Jr. | B60Q 1/268 362/488 |
| 2005/0083183 A1* | 4/2005 | Cao | B60Q 1/268 340/426.13 |
| 2008/0191642 A1* | 8/2008 | Slot | H05B 45/44 315/295 |
| 2009/0003832 A1* | 1/2009 | Pederson | H05B 47/115 398/135 |
| 2009/0157309 A1* | 6/2009 | Won | G01C 21/20 701/533 |
| 2012/0083975 A1* | 4/2012 | Miller | H04B 3/548 701/48 |
| 2012/0274234 A1* | 11/2012 | Campbell | H05B 47/175 315/294 |
| 2013/0200806 A1* | 8/2013 | Chobot | H05B 47/19 315/151 |
| 2013/0208184 A1* | 8/2013 | Castor | H04N 21/4126 348/552 |
| 2013/0266314 A1* | 10/2013 | Lee | H04B 10/2507 398/43 |
| 2014/0226983 A1* | 8/2014 | Vargas | H04B 10/1149 398/66 |
| 2015/0319639 A1* | 11/2015 | Poola | H04W 28/0226 398/115 |
| 2015/0341113 A1* | 11/2015 | Krug | G02B 6/4298 398/118 |
| 2016/0148499 A1* | 5/2016 | Hicks, III | H04L 12/6418 340/506 |
| 2016/0173200 A1* | 6/2016 | Chaillan | H04B 10/116 398/115 |
| 2016/0352100 A1* | 12/2016 | Cheng | B60N 3/14 |
| 2017/0041997 A1* | 2/2017 | Wang | H05B 45/10 |
| 2017/0048935 A1* | 2/2017 | Koo | H05B 45/48 |
| 2017/0082724 A1* | 3/2017 | Brousard | G01S 5/0252 |
| 2017/0164439 A1* | 6/2017 | Reed | F21V 9/30 |
| 2017/0230790 A1* | 8/2017 | Skomra | G06Q 10/08 |
| 2017/0265127 A1* | 9/2017 | Kim | H04W 48/18 |
| 2018/0027630 A1* | 1/2018 | DeJonge | H05B 45/10 315/86 |
| 2019/0132055 A1* | 5/2019 | Deixler | H04B 10/116 |

FOREIGN PATENT DOCUMENTS

| | | |
|---|---|---|
| GB | 2401267 A | 11/2004 |
| WO | 2006032221 A1 | 3/2006 |
| WO | 2011035098 A1 | 3/2011 |

OTHER PUBLICATIONS

Written Opinion of the International Searching Authority dated Feb. 21, 2018 for corresponding International Application No. PCT/FR2017/053202, filed Nov. 22, 2017.

English translation of the Written Opinion of the International Searching Authority dated Jun. 11, 2019 for corresponding International Application No. PCT/FR2017/053202, filed Nov. 22, 2017.

* cited by examiner

COMMUNICATION DEVICE DESIGNED FOR INTERIOR COMPARTMENTS, PARTICULARLY OF MOTOR VEHICLES

CROSS-REFERENCE TO RELATED APPLICATIONS

This application is a Section 371 National Stage Application of International Application No. PCT/FR2017/053202, filed Nov. 22, 2017, the content of which is incorporated herein by reference in its entirety, and published as WO 2018/104607 on Jun. 14, 2019, not in English.

FIELD OF THE DISCLOSURE

The present invention relates to a communication device intended for a passenger compartment, in particular of a vehicle (for example a motor vehicle, a train, an airplane or another vehicle).

A functionality of a device of this type may be for example to perform the role of an access point to a wide area network for terminals present in the passenger compartment, or else to perform the role of a gateway between a wide area network and a local area network in the passenger compartment.

BACKGROUND OF THE DISCLOSURE

Devices of this type intended for a motor vehicle passenger compartment and capable of communicating through radiofrequency transmissions with compatible Wi-Fi terminals present in the passenger compartment in accordance with the Wi-Fi standard (as specified by the IEEE 802.11 standard) are known. These devices provide a Wi-Fi router functionality, and typically incorporate a SIM card and processing circuits, allowing them to connect to a cellular radio network (2G, 3G, 4G, 5G and evolutions), on the one hand, and to offer a Wi-Fi connection to terminals present in the passenger compartment at a bit rate that may reach 150 Mb/second, on the other hand.

However, it is observed that some clients or potential users of devices of this type choose to limit use thereof, or even choose to completely shun these devices, considering that the passenger compartment of a vehicle may form a Faraday cage, having the effect of multiplying radiofrequency waves inside the passenger compartment, thereby exhibiting the particular drawback of increasing the risk of interference for these waves inside the passenger compartment, to the detriment of the quality of service experienced by the user.

SUMMARY

The present invention aims to improve this situation.

To this end, it proposes a communication device, comprising:
a radiofrequency communication module, comprising a processor, a memory operationally coupled to the processor, and a transceiver for transmitting and receiving radiofrequency signals, wherein the processor is configured so as to generate a digital signal from radiofrequency signals received by way of the transceiver, and
an interface module operationally coupled to the radiofrequency communication module so as to:

receive the digital signal generated by the radiofrequency communication module, and configured so as to
modulate, on the basis of the digital signal, an electrical signal intended to supply power to at least one lamp, for the purpose of producing a modulation of light emitted by the lamp on the basis of the digital signal received from the radiofrequency communication module.

The proposed device exhibits numerous advantages, including that of offering a service allowing wireless communication in a vehicle passenger compartment without using radiofrequency waves (for example Wi-Fi radiofrequency waves).

A signal initially received by the radiofrequency communication module is thus finally emitted, for example in a passenger compartment, in the form of a (modulated) light signal, not exhibiting the abovementioned drawbacks of radiofrequency signals.

The Faraday cage phenomenon does not arise with light signals emitted inside a passenger compartment, in particular of a motor vehicle, and the possible interference with radiofrequency waves that could result therefrom does not affect the quality of reception of the light signals.

In one or more embodiments, the proposed device may furthermore comprise at least one lamp connected to the interface module. In these embodiments, the proposed device is autonomous, and then comprises the elements necessary to transmit data that the radiofrequency communication module receives into the passenger compartment. FIG. 2 shows one of these embodiments. In one variant, the interface module of the proposed device is intended to be connected to one or more lamps that are already present in the passenger compartment, as described in detail further on with reference to FIG. 3. Thus, in this implementation in which the proposed device is intended to be implemented in a passenger compartment including at least one lamp, the device comprises an electrical connection in order to link the interface module to this lamp or these lamps of the passenger compartment.

Typically, the abovementioned light modulation may be in accordance with the Li-Fi communication protocol, for example the IEEE 802.15 protocol called "WPAN"™ (for "wireless personal area networks"), specified by the Institute of Electrical and Electronics Engineers (IEEE), regarding the project "Visible Light Communication".

In one implementation, the proposed device furthermore comprises an electrical connection unit intended to be connected to an electric power outlet. This may advantageously be a unit intended to be connected to a cigarette-lighter outlet of a motor vehicle passenger compartment. In this case, the power supply that is provided (for example 12 volts DC via the cigarette-lighter outlet) is compatible with normal Li-Fi communication methods typically using light-emitting diodes.

In one or more embodiments, the interface module may be configured so as to deliver a signal through power line communication, thus intended to supply power to one or more lamps.

In one or more embodiments, the proposed device may comprise a current controller for controlling the supply current to the interface module. Such an implementation makes it possible to stabilize the current that the interface module delivers (in particular the maximum value of the delivered current, without modulation).

In one or more embodiments, the device comprises a photoreceptor linked to the interface module so as to receive a modulated light signal and transmit, via the radiofrequency communication module, a radiofrequency signal corresponding to the received modulated light signal. Such an implementation offers a possible return channel for the terminals present in a passenger compartment (for example for smartphones equipped with an infrared data transmission means), this therefore making it possible to provide bidirectional communication (in the downlink direction, that is to say from the device to a user terminal, and/or in the uplink direction, that is to say from a user terminal to the device) via the device of the invention.

The present invention also targets a method for installing a device as proposed herein, according to the various contemplated embodiments, in a passenger compartment including one or more lamps, the method comprising:
connecting the interface module to a current-controlled electric power source of the passenger compartment,
connecting an output of the interface module to one or more power supply cables of one or more lamps of the passenger compartment.

Thus, in this implementation, the device may advantageously use at least one pre-existing lamp of the passenger compartment to transmit the modulated light signal. As indicated above, it may be advantageous to directly use the power source for the lamps of the passenger compartment, which is normally current-controlled in particular in motor vehicle passenger compartments. However, as a variant, it may be provided for the device itself to incorporate a current controller.

BRIEF DESCRIPTION OF THE DRAWINGS

Other advantages and features of the invention will become apparent from reading the following description of exemplary embodiments of the invention, and from examining the appended drawings, in which.

DETAILED DESCRIPTION OF ILLUSTRATIVE EMBODIMENTS

In the following detailed description of embodiments of the invention, numerous specific details are presented in order to provide a more complete understanding. However, those skilled in the art realize that embodiments may be put into practice without these specific details. In other cases, well-known features are not described in detail so as to avoid needlessly complicating the description.

In the passenger compartments of some currently available motor vehicles, the existing sources for connection to a network (wireless broadband access sources) may be of various types, described below:
what are known as "e-call" modules, reserved for emergency calls and using the emergency telephone number for the European Union (number 112), for example when an accident is detected by the sensors of the vehicle;
Wi-Fi router equipment, presented in the introduction herein; and
monitoring equipment with OBD (for "on-board diagnostics") ports, incorporating a SIM card.

The principle of Wi-Fi router products is that of an access point to terminals in the passenger compartment using Wi-Fi technology, coupled to a broadband module equipped with a SIM card. The broadband module may thus receive the cellular network surrounding the vehicle. The broadband module therefore provides a connection to the Internet, for example via the cellular network, to the terminals connecting to this broadband module via Wi-Fi access.

The invention proposes a different device, in particular in that it comprises a broadband module able to communicate on a radiofrequency network, for example a cellular network, such as a GSM, UMTS, CDMA, HSPA, LTE, LTE-A, etc. network, and connected to a light modulator for light-modulated data communication (for example using the technology known under the acronym "Li-Fi", for "Light Fidelity"), via one or more lamps.

Light modulation communication technologies, and in particular Li-Fi technology, exhibit the advantage of making it possible to offer, in particular inside a passenger compartment, a wireless Internet service that does not use radiofrequency waves, and therefore in particular to limit the drawbacks linked to the use of radiofrequency waves inside a passenger compartment.

Figure 1:
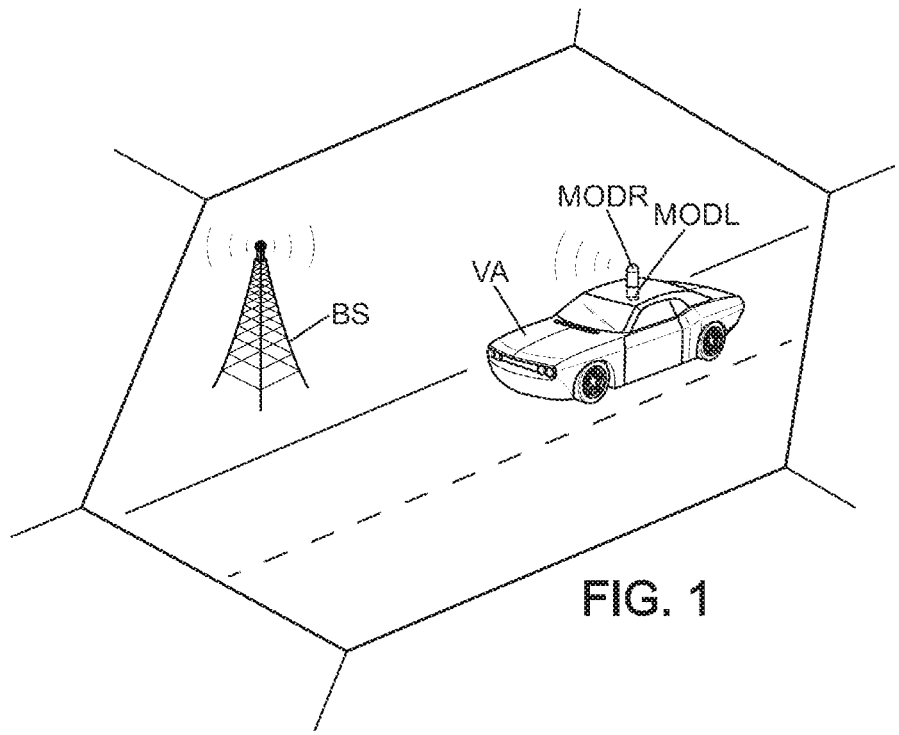
FIG. 1 illustrates an exemplary application of a device within the meaning of the invention, to a motor vehicle passenger compartment.

Thus, with reference to FIG. 1, schematically and non-limitingly illustrating one embodiment of the proposed device, the communication device is embedded in the passenger compartment of a vehicle (in this case a motor vehicle VA) and comprises a radiofrequency communication module MODR.

The module MODR comprises a processor, a memory operationally coupled to the processor, and a transceiver for transmitting and receiving radiofrequency signals. In one or more embodiments, the processor may be configured so as to drive the operations and/or functions of the various elements of the module MODR, and in particular so as to generate a digital signal from radiofrequency signals received by way of the transceiver.

This module MODR thus provides a radiofrequency transceiver function, and is configured so as to be connected, for this purpose, to a radiofrequency network, such as, in the example shown, a cellular radiocommunications network (GSM, UMTS, CDMA, CDMA2000, HSPA, LTE, LTE-A or another network), in this case via a base station BS of the network serving as access point to the radiofrequency network, in order to transmit and receive radiofrequency signals. Depending on the embodiment, the module MODR may furthermore be equipped with a security module, such as a subscriber identification module for identification to the radiofrequency network, such as a SIM (subscriber identity module) card, or an equivalent integrated security module eSIM, in order to receive and transmit data via the radiofrequency network. In one or more embodiments, the module MODR may be configured so as to communicate with radio access points using various radiocommunications technologies or various types of radiocommunications network, such as for example communicate with Wi-Fi radio access points and communicate with radio access points of a cellular network and/or of an ad-hoc network.

Those skilled in the art may realize that there are numerous different types of radiocommunications network, which are cellular or not cellular, and that, depending on the embodiment, the module MODR may incorporate one or more radiofrequency modules and be configured so as to transmit and receive radiofrequency signals using one or more technologies, such as TDMA, FDMA, OFDMA, CDMA, or one or more radiocommunications standards, such as GSM, EDGE, CDMA, UMTS, HSPA, LTE, LTE-A, WiFi (IEEE 802.11) and WiMAX (IEEE 802.16), or variants or evolutions thereof, which are currently known or will be developed subsequently.

In particular, the radiofrequency communication module MODR, typically a broadband module, is (operationally) coupled to a module MODL so as to deliver a light signal into the passenger compartment of the vehicle with a modulation representative of the data received by the radiofrequency module MODR. The modulation of the light signal may be applied using Li-Fi technology. The module MODL may thus perform the role of interface between the communication module MODR and one or more lighting system lamps, thus performing the role of light modem driving the illumination of this lamp or these lamps.

In one example, the broadband module MODR thus has coupled to it a Li-Fi module MODL incorporating for example an LED (light-emitting diode) lamp, supplied with voltage or with current by the module MODL as light modulator linked to the broadband module MODR. The lamp thus supplied with electric power produces a light beam in the visible spectral domain, and flashes at a frequency higher than is perceptible to the human retina (in order to transmit binary data "0" or "1"). Specifically, the Li-Fi module MODL then delivers a modulated current signal, and transmits this signal to the lamp so that said lamp emits a modulated light signal whose changes of state and light frequency are so fast that the flash values are imperceptible to the retina of the eye or to the brain via the optic nerve. The light modem thus varies the luminous intensity of one or more lamps at a very high frequency.

Moreover, in one or more embodiments, the proposed device (incorporating the modules MODR and MODL) may be configured so as to be used for light-modulated wireless bidirectional data communications:
in the downlink direction (from the lamp to a terminal receiving the light signal), and
in the uplink direction, as presented above.

In the latter case, the proposed device may be equipped with a photoreceptor module in order to receive for example an infrared signal coming from a terminal in the passenger compartment in order to relay data (for example a request to access content or a website, or something else).

However, as a variant to this implementation and in a mode in which only the downlink data are transmitted through Li-Fi communications, it is already possible to transmit a single item of content, for example traffic and road safety information, or other content. As a variant to this last implementation, there may also be provision to formulate content requests via the cellular network on a terminal, using an application of the terminal for the purpose of receiving content through Li-Fi communication. Thus, by filling in an identifier of the proposed communication device and a Li-Fi connection identifier specific to the terminal in the application of the terminal, the device is able to receive the data of the requested content via the cellular network and transmit these data through Li-Fi communication. More particularly, these data are transmitted through Li-Fi communication with the identifier of the terminal that requested these data, and such that only the terminal whose application recognizes this identifier is able to retain the received data in order to use them.

Figure 2:
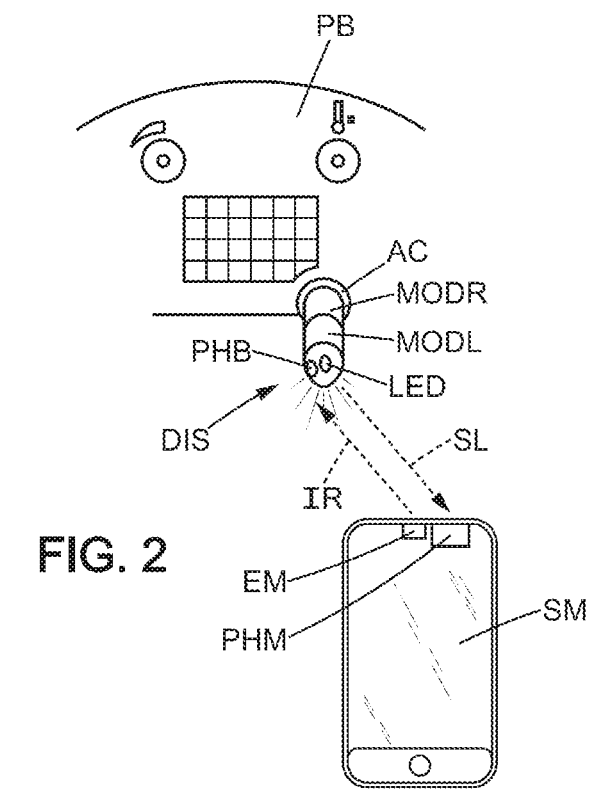
FIG. 2 illustrates an exemplary embodiment of the proposed device, according to an embodiment in which the device is autonomous and is connected to an electric power outlet of the passenger compartment.

By way of example, FIG. 2 shows an embodiment of the proposed device, in this case configured for bidirectional communication of the data with a terminal, such as a smartphone SM. This terminal SM is equipped with a photoreceptor PHM for receiving the Li-Fi data (light signals SL) and with an infrared transmitter EM for relaying the data (IR) to the device DIS.

For its part, the device DIS may comprise the radiofrequency communication module MODR, (operationally) coupled to the module MODL for Li-Fi modulated light emission, linked to a bulb (reference LED in FIG. 2), and an infrared receiver PHD for receiving the data (IR) relayed from the terminal SM.

In the example illustrated in FIG. 2, the device DIS is supplied with electric power by a connection to an electric power supply unit arranged in the passenger compartment of the vehicle, such as for example the electric power outlet of the cigarette lighter AC normally positioned in or close to a dashboard PB of the passenger compartment of a motor vehicle. In this implementation, the device DIS may comprise, for this purpose, an appropriate (male) connection plug that is compatible with a (female) electrical connection outlet of a cigarette lighter, this outlet normally being standard in motor vehicles.

Figure 3:
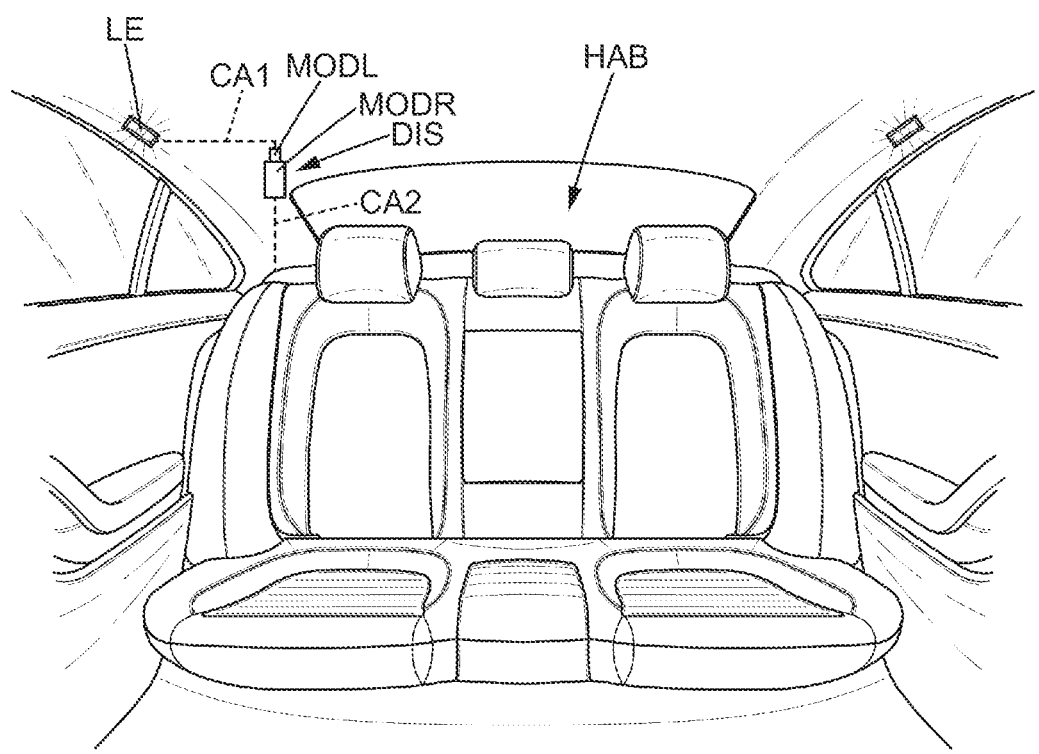
FIG. 3 illustrates another exemplary embodiment of the proposed device, according to an embodiment in which the device is connected to an electric power outlet of the passenger compartment and also to one or more lamps of the passenger compartment.

Reference is now made to FIG. 3 in order to describe an embodiment in which one or more (pre-existing) lamps LE of the passenger compartment HAB are used to transmit Li-Fi data through operational coupling to the light modulation module MODL of the proposed device. An appropriate length of cable CA1 may be provided for the connection of the lamp (or lamps) forming, in the illustrated embodiment, the operational coupling to the device DIS, which device may be situated in an appropriate location of the passenger compartment HAB and be connected there to an electric power source (cigarette lighter or another power source). As in the implementation of FIG. 2, the module MODL receives, from the radiofrequency module MODR, a signal containing the communication data received from the radiofrequency network, and converts this signal into an electrical (current or voltage) signal supplying power to the lamp or lamps LED, this electrical signal then being amplitude-modulated depending on these received data (typically using Li-Fi technology).

Modern motor vehicles are often equipped with light-emitting diode lamps (denoted "Led" hereinafter). These lamps in particular illuminate the passenger compartment, and may typically be driven in accordance with turn-on/turn-off conditions. The proposed solution makes it possible to offer wireless communications via such Led lamps (for example of 5 watts, "w5w" type) distributed in the passenger compartment of a vehicle. These lamps are associated with the module MODL in order to transform the electrical signals that they receive into light signals, with the modulation of the illumination amplitude driven by the module MODL.

Specifically, two types of lamp are found in a motor vehicle:
those for external lighting, and
those that are LED (or light-emitting diode), for the internal lighting system (w5w type).

The two electrical circuits respectively corresponding to these two types of lamp are independent. The internal electrical lighting system circuit connects any secondary circuit or any connector of the passenger compartment of the vehicle. In particular, the cigarette-lighter outlet is connected to the same electrical circuit as that of the internal lighting system of the vehicle (for the vast majority of motor vehicle manufacturers and motor vehicle models). The lamps may thus be connected to the electrical network using a technique similar to that of power line communication with a link to the radiofrequency module MODR, the latter being connected for example to the cigarette-lighter electrical outlet (or else in the electrical distribution circuit internal to the passenger compartment). The module MODR may thus be connected to the electrical network of the internal lighting system of the passenger compartment of the vehicle and control the illumination of the lamps LED, through operational coupling to the module MODL.

In a motor vehicle, a power supply block of the internal lighting system circuit generates a controlled current, which may be supplied at input of the light modem MODL. This module MODL, depending on the signal received from the radiofrequency module MODR, delivers the (binary) electrical signal for supplying power to the lamp LED, which then produces a modulated light signal.

The device as shown in FIG. 2 is "unitary" in the sense that all of its components are combined in one and the same housing, as illustrated in FIG. 2. However, as a variant to connecting such a unitary device to the cigarette-lighter outlet, the device may comprise components distributed in the vehicle, as illustrated in FIG. 3, by providing for example a connection cable CA2 specific to the modules MODR and MODL of the device, and appropriate cables CA1 for the various lamps to be connected. The modules MODR and MODL may thus also be connected to the electrical circuit of the internal lighting system of the vehicle.

The voltage of the electric current flowing in this internal electrical circuit of the passenger compartment is conventionally 12 volts, thereby ensuring good use of Li-Fi technology, as normal Li-Fi light modems (corresponding for example to the module MODL) ideally operate with a minimum power supply of 12 volts. Moreover, it should be noted that new Led lamps directly incorporate a light modem, and in particular a port for connection and data reception through power line communication (CPL). It is thus possible to connect a lamp of this type to the radiofrequency module MODR delivering a signal able to be utilized directly by this lamp.

However, it may also be advantageous, for economic reasons, to have a single central light modem MODL distributing one and the same electrical signal to one or more lamps of the passenger compartment (or else, as a variant, to provide a modem MODL capable of distributing various signals on the basis of the lamps so as to respectively address these lamps with signals specific to each of them, for example on the basis of the proximity of a terminal liable to receive these data).

Figure 4:
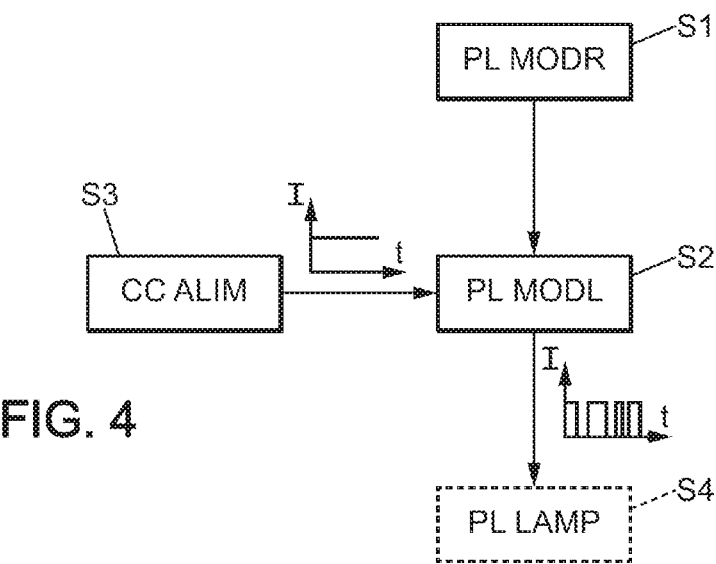
FIG. 4 illustrates the steps of a method for installing and for connecting a device according to one or more embodiments.

FIG. 4 illustrates a method (for example performed by a motor vehicle manufacturer) for installing and for connecting a device according to one or more of the proposed embodiments to at least one lamp of the passenger compartment of the vehicle. The proposed method may comprise connecting (S1) the radiofrequency communication module MODR to a power supply of the vehicle. Prior to this connection S1, a SIM card may be inserted into the module MODR. The proposed method furthermore provides connecting (S2) the interface module MODL to the lighting system circuit of the passenger compartment of the vehicle, which is usually current-controlled (S3). This control normally makes it possible to deliver a light amplitude of one and the same level. The light modulated by the module MODL thus remains true to the signal coming from the communication module MODR, and the light is not interpreted incorrectly by a terminal receiving the light signal (insofar as the terminal is positioned so as to receive the luminous flux). The interface module MODL may be connected beforehand to the communication module MODR (in a compact unitary device), or, as a variant, a connection may be provided between the two modules MODR and MODL, during the installation of the device. Furthermore, appropriate lamps may be installed (S4) in the passenger compartment if necessary. This installation may prove not to be necessary, for example if the Led lamps already installed in the passenger compartment, in particular if this is a motor vehicle passenger compartment, are already designed to implement this embodiment (this installation S4 is itself also illustrated by dashed arrows in FIG. 4).

Figure 5:
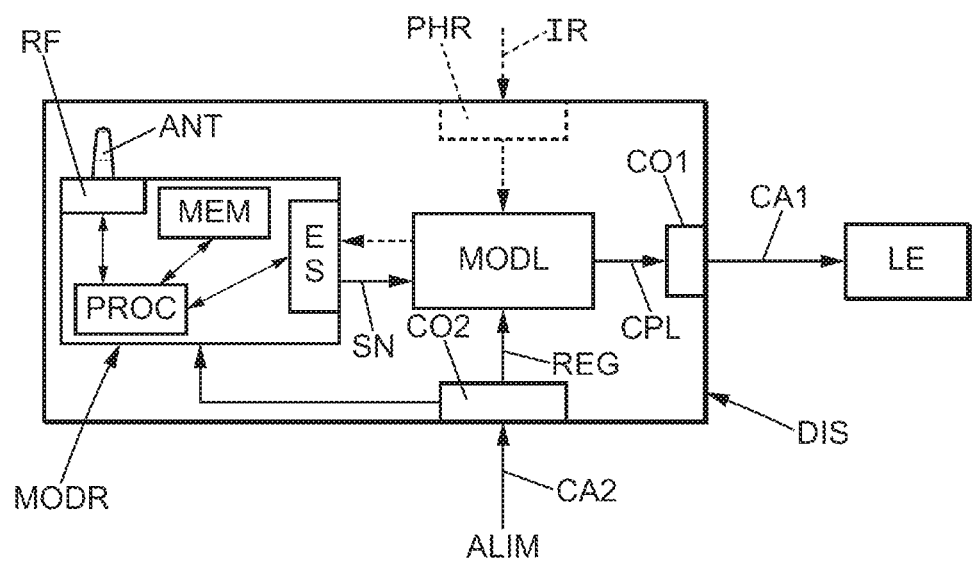
FIG. 5 illustrates some modules that the proposed device comprises in one or more embodiments, and their connections in one exemplary embodiment.

Reference is now made to FIG. 5 in order to describe an exemplary implementation of the proposed device DIS. Such a device comprises a radiofrequency communication module MODR typically comprising a radiofrequency (RF) transceiver module including an antenna ANT and configured so as to transmit/receive radiofrequency signals, operationally coupled to a processing circuit comprising a processor PROC operationally coupled to a memory MEM. The processor PROC of the radiofrequency communication module may be configured, in particular in the case of reception of a signal by the RF transceiver module, so as to deliver (via the interface ES) a digital signal SN intended for an interface module MODL operationally coupled to the radiofrequency communication module MODR.

The interface module MODL may be configured so as to receive the digital signal SN coming from the radiofrequency communication module MODR, and so as to deliver, for the purpose of transmission through power line communication (CPL), a modulated electrical signal corresponding to the signal SN and intended to supply power to one or more lamps LE of the passenger compartment via the connection CO1 to one or more cables CA1.

Depending on the embodiment, the device DIS may furthermore comprise an electrical connection CO2 in order to receive a supply of electric power from a source of the passenger compartment (via the cable CA2 in the example of FIG. 3), this power source typically being current-controlled. As an alternative, the proposed device may comprise a current controller for controlling this power source. This current controller may be integrated into the interface module MODL or directly into the electrical connection CO2 so as to supply both the radiofrequency module MODR and the interface module MODL with a controlled current.

In one particular embodiment (illustrated in dashed lines in FIG. 5), the device DIS may furthermore comprise a photoreceptor PHD (for example an infrared receiver) in order to receive modulated light signals from one or more terminals, generate electrical signals from the received light signals, and transmit these electrical signals to the interface module MODL. In this embodiment, the interface module MODL will be configured so as to format these electrical signals in order to deliver, to the radiofrequency communication module MODR, digital signals relayed via this uplink channel for a radiofrequency transmission.

The passengers in the passenger compartment may use terminals that are computers, tablets, smartphones equipped with Li-Fi readers in order to access the Internet, and more generally communicate through Li-Fi/infrared. As indicated above, visible light modulated using Li-Fi technology may be used for downlink flows, and infrared may be used for uplink flows.

The invention is not limited to an implementation inside a motor vehicle, and may be implemented on any vehicle, be this a transport means on the ground (road or rail), sea, or in the air (in particular on any aircraft).

Depending on the embodiment chosen, some acts, actions, events or functions of each of the methods and processes described in the present document may be performed or take place in an order different from that in which they have been described, or may be added, combined or else may not be performed or may not take place, as the case may be. Furthermore, in some embodiments, some acts, actions or events are performed or take place concurrently and not successively.

Although they have been described through a certain number of detailed exemplary embodiments, the proposed communication device and the proposed method for installing the device comprise various variants, modifications and improvements that will become obviously apparent to those skilled in the art, it being understood that these various variants, modifications and improvements form part of the scope of the invention as defined by the following claims. In addition, various aspects and features described above may be implemented together or separately or else substituted with one another, and all of the various combinations and sub-combinations of the aspects and features form part of the scope of the invention. Furthermore, it may be the case that some systems and equipment described above do not incorporate all of the modules and functions described for the preferred embodiments.

The invention claimed is:

1. A communication device configured to be implemented in a passenger compartment of a vehicle and to communicate with at least one lamp pre-existing in the passenger compartment for illuminating the passenger compartment, the communication device comprising:
    a radiofrequency communication module comprising a processor, a non-transitory computer-readable memory operationally coupled to the processor, and a transceiver for transmitting and receiving radiofrequency signals, wherein the processor is configured to generate a digital signal representing data from radiofrequency signals received by way of the transceiver; and
    an interface module comprising an electrical connection configured to link the interface module to the at least one pre-existing lamp of the passenger compartment and wherein the interface module is operationally coupled to the radiofrequency communication module so as to:
    receive the digital signal generated by the radiofrequency communication module; and
    amplitude modulate an electrical signal configured to power the at least one pre-existing lamp on the basis of the digital signal received from the radio-frequency communication module to produce an amplitude modulation of light emitted by the at least one pre-existing lamp representing the data,
wherein the communication device is further configured to receive data of a content requested by a terminal via a radiofrequency network and to transmit the received data with an identifier of the terminal that requested the content via the at least one pre-existing lamp, such that only the terminal recognizing said identifier is able to retain said received data in order to use the received data.

2. The communication device as claimed in claim 1, furthermore comprising the at least one pre-existing lamp, which is connected to the interface module.

3. The communication device as claimed in claim 1, furthermore including an electrical connection unit connectable to an electric power outlet.

4. The communication device as claimed in claim 3, wherein the electrical connection unit is configured to be connected to a cigarette-lighter outlet of a motor vehicle passenger compartment.

5. The communication device as claimed in claim 1, wherein the interface module is configured so as to deliver a signal through power line communication.

6. The communication device as claimed in claim 1, including a current controller for controlling a supply current at least to the interface module.

7. The communication device as claimed in claim 1, including a photoreceptor linked to the interface module so as to receive a modulated light signal and transmit, via the radiofrequency communication module, a radiofrequency signal corresponding to the received modulated light signal.

8. The communication device as claimed in claim 1, wherein said light amplitude modulation is in accordance with a Li-Fi protocol.

9. The communication device as claimed in claim 1, wherein the radiofrequency communication module, the interface module, the at least one pre-existing lamp and the electrical connection are distributed in the passenger compartment.

10. The communication device as claimed in claim 1, wherein the content is requested by an application of the terminal via a radiofrequency network, and wherein the communication device is further configured to transmit the identifier of the terminal that requested the content with the received data of the content such that only the terminal whose application recognizes said identifier is able to retain said received data in order to use the received data.

11. The communication device as claimed in claim 1, wherein the radiofrequency network is a cellular network of the terminal.

12. A method comprising:
    installing a communication device in a passenger compartment of a vehicle configured to communicate with at least one lamp pre-existing in the passenger compartment for illuminating the passenger compartment, the communication device comprising:
    a radiofrequency communication module comprising a processor, a non-transitory computer-readable memory operationally coupled to the processor, and a transceiver for transmitting and receiving radiofrequency signals, wherein the processor is configured to generate a digital signal representing data from radiofrequency signals received by way of the transceiver; and
    an interface module operationally coupled to the radiofrequency communication module so as to:
    receive the digital signal generated by the radiofrequency communication module; and
    amplitude modulate an electrical signal configured to power the at least one pre-existing lamp on the basis of the digital signal received from the radiofrequency communication module to produce an amplitude modulation of light emitted by the at least one pre-existing lamp representing the data,
    wherein:
    the communication device is further configured to receive data of a content requested by a terminal via a radiofrequency network and to transmit the received data with an identifier of the terminal that requested the content via the at least one pre-existing lamp, such that only the terminal recognizing said identifier is able to retain said received data in order to use the received data; and the installing comprises:
  connecting the interface module to a current-controlled electric power source of the passenger compartment; and
  connecting an electrical output of the interface module to a power supply cable of said at least one pre-existing lamp of the passenger compartment.

13. A communication device configured to be implemented in a passenger compartment of a vehicle and to communicate with at least one lamp pre-existing in the passenger compartment including a plurality of pre-existing lamps for illuminating the passenger compartment, the communication device comprising:
  a radiofrequency communication module comprising a processor, a non-transitory computer-readable memory operationally coupled to the processor, and a transceiver for transmitting and receiving radiofrequency signals, wherein the processor is configured to generate a digital signal representing data from radiofrequency signals received by way of the transceiver; and
  an interface module comprising an electrical connection configured to link the interface module to the plurality of pre-existing lamps of the passenger compartment and wherein the interface module is:
  operationally coupled to the radiofrequency communication module so as to receive the digital signal generated by the radiofrequency communication module; and
  configured amplitude modulate an electrical signal used to power the plurality of pre-existing lamps on the basis of the digital signal received from the radio-frequency communication module to produce an amplitude modulation of light emitted by the plurality of pre-existing lamps representing the data,
  wherein:
    the interface module is configured to distribute said electrical signal to the plurality of pre-existing lamps; and
    the communication device is further configured to receive data of a content requested by a terminal via a radiofrequency network and to transmit the received data with an identifier of the terminal that requested the content via the at least one pre-existing lamp of the plurality of pre-existing lamps, such that only the terminal recognizing said identifier is able to retain said received data in order to use the received data.

14. A communication device configured to be implemented in a passenger compartment of a vehicle and to communicate with at least one lamp pre-existing in the passenger compartment including a plurality of pre-existing lamps for illuminating the passenger compartment, the communication device comprising:
  a radiofrequency communication module comprising a processor, a non-transitory computer-readable memory operationally coupled to the processor, and a transceiver for transmitting and receiving radiofrequency signals, wherein the processor is configured to generate a digital signal representing data from radiofrequency signals received by way of the transceiver; and
  an interface module comprising an electrical connection configured to link the interface module to the plurality of pre-existing lamps of the passenger compartment and wherein the interface module is:
  operationally coupled to the radiofrequency communication module so as to receive the digital signal generated by the radiofrequency communication module; and
  configured to amplitude modulate at least an electrical signal used to power the plurality of pre-existing lamps on the basis of the digital signal received from the radio-frequency communication module to produce an amplitude modulation of light emitted by the plurality of pre-existing lamps representing data,
  wherein the communication device is further configured to receive data of a content requested by a terminal via a radiofrequency network and to transmit the received data with an identifier of the terminal that requested the content, via the at least one pre-existing lamp of the plurality of pre-existing lamps, such that only the terminal recognizing said identifier is able to retain said received data in order to use the received data.

* * * * *